United States Patent [19]

Hicks, Jr.

[11] Patent Number: 4,758,087
[45] Date of Patent: Jul. 19, 1988

[54] FIBER OPTIC TRANSDUCER

[75] Inventor: John W. Hicks, Jr., Northboro, Mass.

[73] Assignee: Polaroid Corporation, Cambridge, Mass.

[21] Appl. No.: 36,183

[22] Filed: Apr. 9, 1987

Related U.S. Application Data

[63] Continuation of Ser. No. 637,491, Aug. 3, 1984, abandoned, which is a continuation-in-part of Ser. No. 549,875, Nov. 9, 1983, Pat. No. 4,659,923, which is a continuation-in-part of Ser. No. 241,861, Mar. 9, 1981, abandoned, and a continuation-in-part of Ser. No. 331,052, Dec. 16, 1982, abandoned.

[51] Int. Cl.$^4$ ............................................. G01B 9/02
[52] U.S. Cl. .................................... 356/345; 250/227; 356/352
[58] Field of Search ................. 356/345, 352; 250/227

[56] References Cited

U.S. PATENT DOCUMENTS

| | | |
|---|---|---|
| 4,002,997 | 1/1977 | Thompson . |
| 4,136,929 | 1/1979 | Suzaki . |
| 4,315,666 | 2/1982 | Hicks, Jr. . |
| 4,325,636 | 4/1982 | Schiffner . |
| 4,342,499 | 8/1982 | Hicks, Jr. . |
| 4,354,760 | 10/1982 | Schiffner . |
| 4,469,397 | 9/1984 | Shaw et al. . |
| 4,482,248 | 11/1984 | Papuchon et al. ............. 356/352 X |
| 4,530,603 | 7/1985 | Shaw et al. ........................ 356/345 |

OTHER PUBLICATIONS

Hill et al, "CW Brillouin Laser", App. Phys. Lett., vol. 28, No. 10, pp. 608–609, 5/76.
Haavisto et al., "Resonance Effects in Low-Loss Ring Waveguides", Opt. Lett., vol. 5, No. 12, pp. 510–512, 12/80.

Primary Examiner—Davis L. Willis
Assistant Examiner—Matthew W. Koren
Attorney, Agent, or Firm—Francis J. Caufield

[57] ABSTRACT

An optical physical condition sensor includes an optical fiber resonant cavity into which optical energy, including wavelengths resonatable within the cavity, is introduced. External physical conditions, such as temperature or pressure, change the effective optical path length within the cavity to cause a corresponding change in the cavity's resonant characteristics. Changes in the sensed condition can be determined as a function of changes in the wavelength of optical energy peaks or minimas in the cavity or changes in the cavity's finesse characteristics.

31 Claims, 4 Drawing Sheets

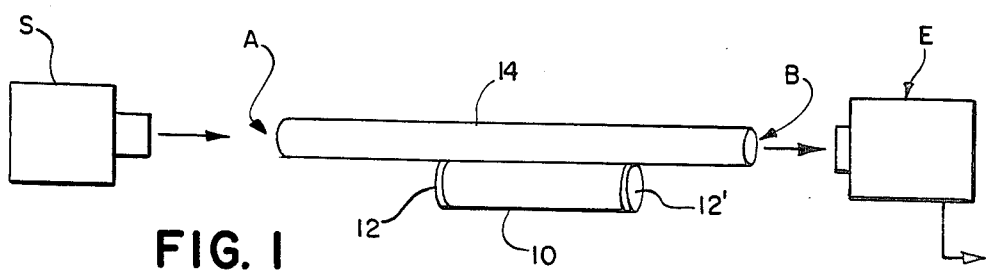
FIG. 1
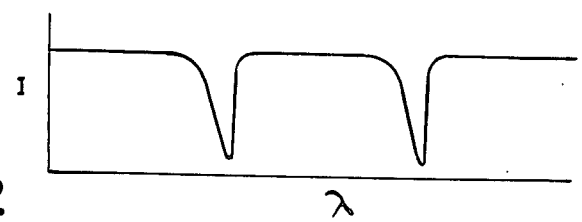
FIG. 2
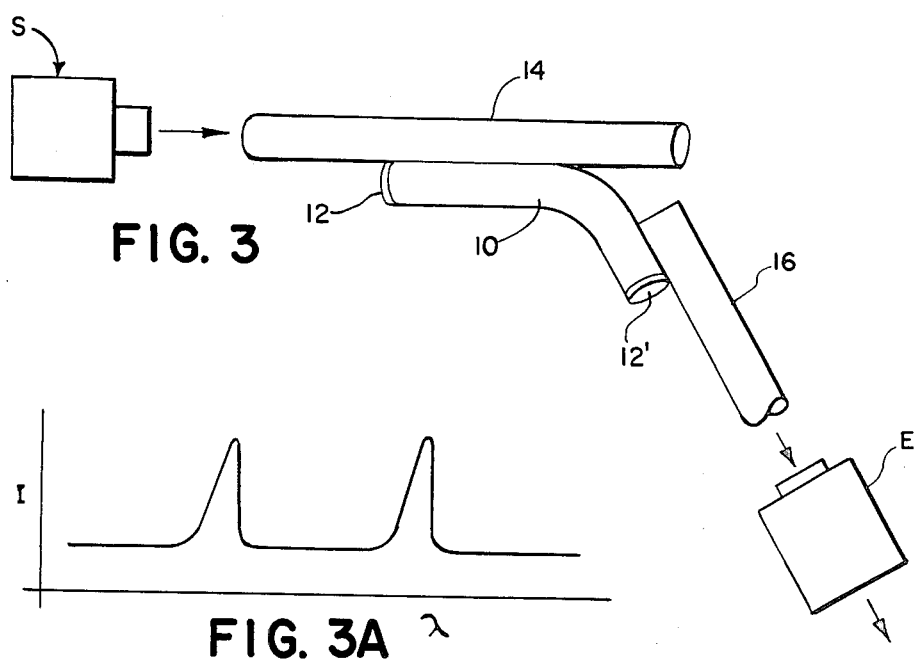
FIG. 3
FIG. 3A

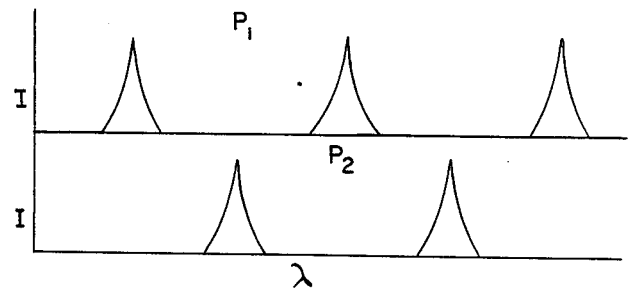
FIG. 4
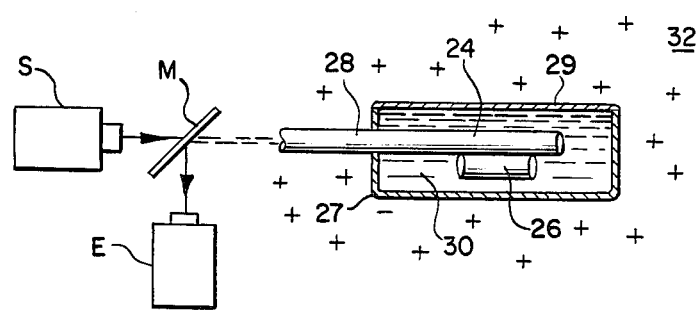
FIG. 5
FIG. 5A  FIG. 5B 
FIG. 6
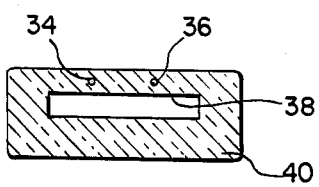
FIG. 7
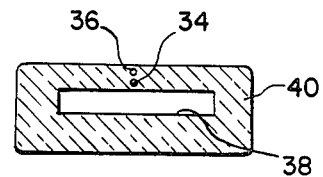
FIG. 8

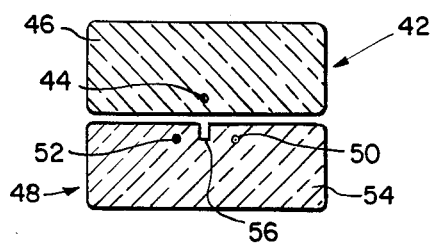
FIG. 9
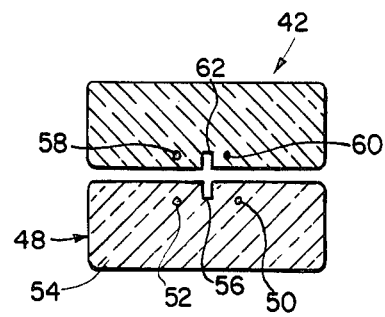
FIG. 10
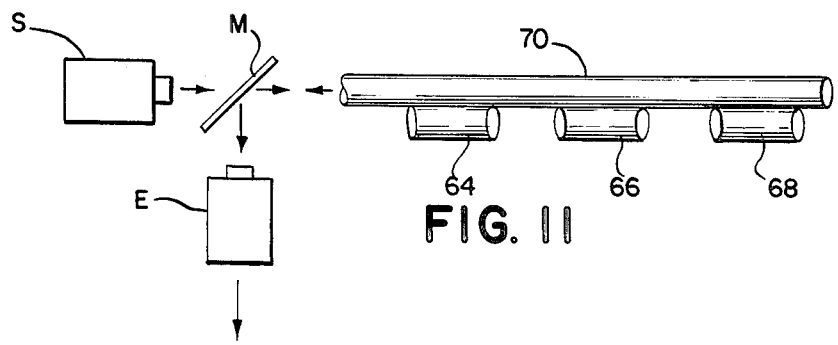
FIG. 11
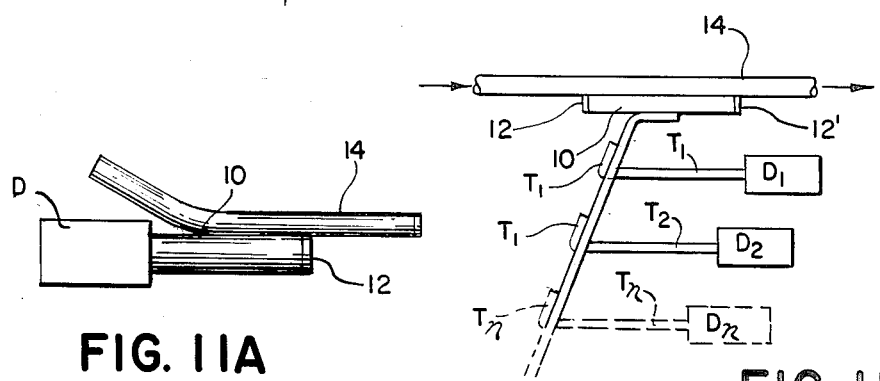
FIG. 11A
FIG. 11B
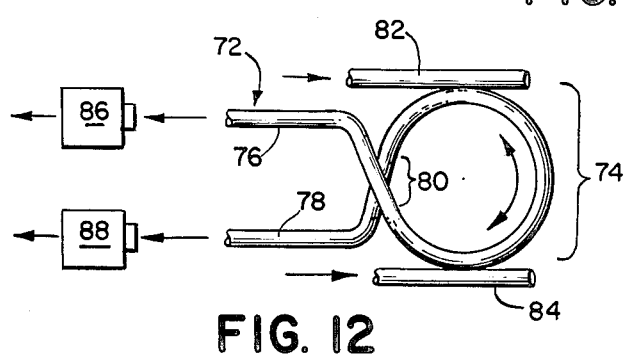
FIG. 12

FIBER OPTIC TRANSDUCER

CROSS-REFERENCE TO RELATED APPLICATIONS

This application is a continuation of applicaton Ser. No. 637,491, filed 8/3/84, now abandoned, which is a continuation-in-part of U.S. patent application Ser. No. 549,875, U.S. Pat. No. 4,659,923 filed Nov. 9, 1983 for FIBER OPTIC INTERFEROMETER TRANSDUCER, which, in turn, is a continuation-in-part of U.S. patent application Ser. Nos. 241,861, now abandoned, filed Mar. 9, 1981 for FIBER OPTIC PRESSURE TRANSDUCER, now abandoned, and 331,052, now abandoned filed Dec. 16, 1982 for OPTICAL RESONANT CAVITY FILTERS.

BACKGROUND OF THE INVENTION

This invention relates to transducers, and modulators and sensor devices constructed therewith which are responsive to physical quantities such as pressure, temperature, etc., and, in particular, to such transducers and transducer devices utilizing fiber optics.

There are a variety of ways of altering the optical path length of an optical core in an optical waveguide, such as by stretching the waveguide or fiber to change its physical length, raising the index of refraction of the core material by raising the temperature, or even by altering the characteristics of regions just outside the core. Examples of practical applications of such optical path length altering methods may be found in the cross-referenced Ser. No. 549,875 and Ser. No. 241,861 patent applications. Indeed, much work has been done to build interferometric sensors in which one of the two arms of an optical fiber interferometer is made subject to an external field or other condition to be sensed. In the Ser. No. 549,875 and Ser. No. 241,861 applications, the present inventor has described a method of using a single optical core to carry both beams of the interferometer, each in a different polarization state. Also described were various waveguide structures, including complex internal architectures and hollow cavities, that can be used to magnify the effects of an external field or sensed condition, such as pressure, on the core and thereby enhance the sensitivity of the interferometer.

With the recent advances exemplified by the invention disclosed in U.S. patent application Ser. No. 331,052 for OPTICAL RESONANT CAVITY FILTERS, it is practical to utilize resonant cavity structures as transducers or sensors. There are several advantages to resonant cavity transducers.

For a given length, a resonant cavity is more sensitive than the two-armed interferometer, and the increased sensitivity is proportional to the "finesse" of the device. The "finesse" of an optical device is the ratio of the spacing between output peaks or spikes to the width of the peaks.

Secondly, a resonant cavity lends itself naturally to a method of determining the value of the perturbing parameter in which a narrow wavelength source is scanned by the sensor and peak shift is determined. The wavelength shift of the output looks much like the parameter dependence in contrast to interferometric devices where output typically varies in a sinusoidal manner with parameter variation.

A third advantage is that resonant cavities do not require the splitting of a source beam into two separate beams and the subsequent recombining of the beams at the interferometer output.

A fourth advantage is that a resonant cavity is relatively insensitive to input power changes in the beam, particularly in the wavelength scanning mode, so long as the power variation is slow compared to scanning time. On the other hand, the interpretation of an interferometer output is absolutely dependent on the power input unless wavelength scanning, a reference beam, or some equivalent is used.

The fifth advantage is that a resonant cavity device does not require a reference arm and, accordingly, the output of a resonant cavity device is not subject to errors in the reference beam, as can occur in an interferometer device.

SUMMARY OF THE INVENTION

In accordance with the present invention, a transducer device features an optical waveguide resonant cavity, either by providing reflective ends on an optical fiber segment or by coupling the ends of an optical fiber segment onto each other to form a loop such that a selected wavelength of light introduced into the cavity structure by another fiber will resonate within the cavity. When the resonant cavity is exposed to an environment condition or field (e.g., a thermal or pressure field) that is effective to change the optical path length of the resonant cavity and, accordingly, its resonant characteristics, the observable resonant frequency of the cavity changes in a manner that varies as a function of the condition or field. In addition to sensing environmental variations, the external field may also be controlled to produce variations in the resonant wavelength for modulation or general switching applications of the transducer.

Accordingly, a primary object of the present invention is to provide an optical transducer, and switching, modulating or sensing applications thereof, that use fiber optics construction.

A further object of the present invention is to provide a transducer that utilizes optical waveguides configured as resonant cavities.

These and other objects of the present invention are satisfied by an optical fiber transducer that features an optical fiber formed into a resonant cavity structure, either by providing reflective end portions on an optical fiber segment or by coupling the ends of an optical fiber segment to itself to form a loop; means for introducing light energy into the resonant cavity structure; and means for detecting the change in resonant characteristics of the resonant cavity in response to exposure of the resonant cavity to a physical force or condition, such as pressure, stress, heat or absorption of the surrounding medium, etc.

A basic form of the present invention includes forming a resonant cavity from an optical fiber segment having mirrored ends or looped back on and coupled to itself in conjunction with respectively coupled input and output fibers. More sophisticated forms include a resonant cavity or cavities in, formed as, or embedded in substrates that are designed to enhance the device sensitivity. Additionally, optical amplification, including amplification by Raman stimulated emission, can be utilized.

Other objects, features and advantages of the present invention are provided in the following, more detailed, description of preferred and alternative embodiments by reference to the accompanying drawings.

BRIEF DESCRIPTION OF THE DRAWINGS

FIG. 1 is a schematic representation of a basic embodiment of the invention;

FIG. 2 is a graphical representation of the light energy output of the embodiment of FIG. 1;

FIG. 3 is a schematic representation of an alternative embodiment of the invention wherein the output energy is taken directly from the resonant cavity;

FIG. 3a is a graphical representation of the light energy output of the embodiment of FIG. 3;

FIG. 4 is a cross-sectional representation of a rectangular fiber useful for the present invention;

FIG. 5 is a graphical representation of the light energy output of the fiber of FIG. 4, showing the relationship between its two polarization modes;

FIG. 5a is a cross-sectional representation of a rectangular optical fiber for preferentially cutting off selected polarization modes;

FIG. 5b is cross-sectional representation of an elliptical optical fiber for preferentially cutting off selected polarization modes;

FIG. 6 is a schematic representation of an in vivo blood analysis sensor utilizing the present invention;

FIG. 7 is a schematic representation, in cross-section, of a dual core fiber useful in the present invention;

FIG. 8 is an alternative embodiment of the dual core fiber of FIG. 7;

FIG. 9 is a schematic representation, in cross-section, of a dual core cavity fiber coupled to a single core feed fiber;

FIG. 10 is a schematic representation, in cross-section, of a dual core cavity fiber coupled to a dual core feed fiber;

FIG. 11 is a schematic representation of a multiple sensor network;

FIG. 11a is an illustration of an optical fiber cavity coupled to a laser diode optical energy source;

FIG. 11b is a representation of a transducer/sensor arrangement in which stimulated Raman emission is utilized in order to increase overall performance;

FIG. 12 is a schematic representation of a loop cavity arrangement utilizing dual sensing beams;

DESCRIPTION OF THE PREFERRED EMBODIMENTS

Figure 13:
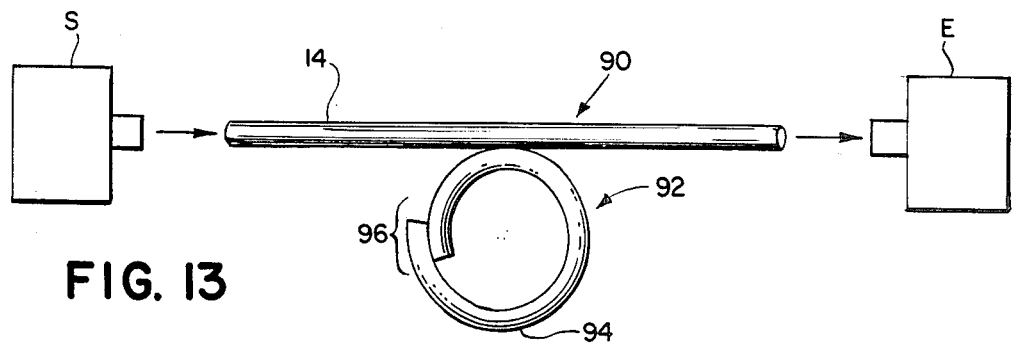
FIG. 13 is a schematic representation of a loop cavity transducer/sensor arrangement.

As shown in FIG. 1, a transducer in accordance with the present invention can be formed from a selected length (e.g., 1 cm) of a single mode optical fiber 10 having reflective, or that is, mirrored ends 12 and 12' and laterally coupled to another fiber segment 14. The mirrored ends 12 and 12' may be formed by polishing and reflectively coating the ends of the fiber 10. For clarity of the description, the diameter of the fibers are of course greatly exaggerated. Optical energy, distributed over a range of frequencies, is introduced into the fiber 14 entry port A from a modulated optical source S and exits from an exit port B. An optical, spectral analyzer or evaluator E is provided to evaluate and analyze the optical energy from the exit port B.

Due to the resonant characteristics of the resonant cavity defined by fiber 10, the light energy output from the exit port B of the fiber 14 will vary as a function of wavelength as shown in FIG. 2. As shown therein, the magnitude of the energy level "I" at the exit port B remains constant as a function of wavelength except in those regions of the spectrum in which the cavity resonates to cause a corresponding "dip" in the energy level exiting the fiber 14. Alternately, an output similar to that shown in FIG. 2 may also be obtained by analysis of light exiting from entry port A or, that is, light reflected from the virtual mirror effect of the resonant cavity. The wavelength of the output peaks (or valleys) is dependent on the physical characteristics of the cavity, which characteristics can be affected by an external physical quantity, condition or stimuli. Thus, by detecting and responding to the changes in the output peaks (or valleys), the physical quantity can be measured.

The input light can arise from any source able to produce a stable output of one or multiple frequencies, such as a laser diode. Thus, very narrow band, or single frequency source, can be utilized in the practice of the invention, although a scanning input or, that is, multiple frequency source is generally preferred for sensor applications. In regard to the latter, a single frequency source can, in fact, be modulated in accordance with the invention as later explained in detail in FIG. 14. However, a single frequency input can provide transducer switching in response to, or sensing of, a precise environmental value where one of the cavity resonant wavelengths corresponds to the source wavelength. For sensing or transducing over a broad range of values, however, a modulated or comparibly broad band source having a spectral band ranging over the resonant wavelengths and/or its side orders is desirable for sensor tracking over a suitable range of environmental values.

For analysis of a single wavelength, the evaluator E may include a single spectral analyzer tuned to the source wavelength; for example, a photodetector (not shown) fed by an optical, narrow pass band filter (not shown) will provide a null when the cavity is externally tuned to the source wavelength. On the other hand, to provide suitable tracing, a broader band spectral analyzer is desired, for example, of the type having a plurality of passband filters, aligned to cover the spectrum of interest, with each feeding its own detector. The detectors, in turn, being read by an electronic switch.

As shown in FIG. 3, an output fiber 16 can be laterally coupled to the cavity fiber 10 to detect an output signal directly from the cavity fiber. The signal present in the output fiber 16, as shown in FIG. 3a, is generally the inverse of that shown in FIG. 2. More specifically, the magnitude of the energy I in the output fiber 16 remains relatively constant as a function of wavelength $\lambda$ except in those regions of the spectrum in which the cavity resonates to cause a corresponding wavelength dependent energy peak in the cavity fiber 10 and the output fiber 16.

The waveguide fibers shown in FIGS. 1 and 3 are preferably of the type disclosed in U.S. Pat. No. 4,315,666 and, as such, are of rotationally nonsymmetric construction such that their cores (not shown) are eccentrically positioned in the cladding to facilitate lateral evanescent coupling between the waveguides. Additionally, the core and cladding structure may be varied to produce an enhanced sensitivity to a desired physical parameter. For example, the structure of FIG. 4 may be utilized to fabricate a fiber cavity wherein core material 18 is surrounded by a generally rectangular cladding 20 in which a rectangular, longitudinally extending internal opening 22 is formed with the upper wall surface of the opening proximate the core 18. When the core and cladding structure of FIG. 4 is exposed to a pressure field, the longer wall section tends to yield inwardly to, in effect, magnify the perturbing influence of the applied pressure.

As in known in the art and as described in the cross-referenced U.S. application Ser. No. 549,875, optical fibers generally will support single mode light transmission in first and second polarization modes, P1 and P2, with each polarization mode exhibiting resonant peaking and with the resonant peaks being spectrally interspaced with one another as shown in FIG. 5. If desired, one polarization mode set can be eliminated by using a single polarization fiber, by introducing only one polarization mode from the feed line, or by exciting only one polarization mode in the resonant cavity.

While meaningful information can be obtained from a single polarization mode of the fiber, additional information can be obtained by utilizing and/or observing the sets of lines of both polarization modes. For example, if the transducer is to be used as a pressure sensor, the output signals in both polarization modes P1 and P2 will be dependent on temperature because the optical path length is affected by temperature induced thermal expansion. However, a change in temperature will affect the two polarization lines differently from a change in pressure, which can preferentially affect one polarization mode more than the other, depending upon the physical structure of the resonant cavity fiber. Therefore, by observing both sets of lines it is possible to sense or determine both pressure and temperature. The device can be calibrated by simply observing the two polarization mode outputs as the resonant cavity is exposed to known pressure and temperature excursions. Evaluation of both polarization states can be accomplished by means of a divider (not shown) located at the device output to separately direct the light of each polarization state to its own respective evaluator.

In addition to single mode fibers, it is possible to utilize multimode fibers which allow two or three modes, each having two polarization states, to be excited in the cavity. The extra sets of lines provided by the supported higher order modes can be used to provide differing transducer signals and thus additional information about the sensed environment to which the transducer is exposed, since the various modes and polarizations are not shifted in the same ratios by various perturbations. Also, the structure of the optical fiber resonant cavity can be varied to cut off one of the polarization states for the higher order modes. For example, a multimode fiber having somewhat rectangular or elliptical light transmitting cross-section, as represented by the fibers 10' and 10" in FIGS. 5a and 5b, can be dimensioned to support two modes, each having two respective polarization states, in some wavelength region. A fiber having a rectangular or elliptical cross-section, depending upon the ratio and magnitude of the major and minor dimensions, will cut off one polarization state for all but the lowest order mode and support light transmission for the other polarization state for both the lowest and higher order modes supported.

For those modes that are supported by the fiber, the evanescent wave of each successively higher order mode will penetrate further into the cladding than the lowest order mode. Accordingly, the evanescent waves of the supported higher order modes will be more sensitive to environmentally induced perturbations in regions further from the core. Thus, a multimode resonant cavity sensor is provided in which environmental optical conditions such as the index of refraction and absorption of the environment can perturb the evanescent waves of the supported higher order modes in such a way that meaningful information regarding such condition can be obtained. For example, as shown in FIG. 6, a multimode evanescent wave sensor can be used for in-vivo blood analysis in which the differential influence of index of refraction and absorption of the medium on the higher order mode can be used to measure the optical properties of the blood. In this application, the core (not shown) of the fiber cavity is preferably positioned in its cladding adjacent the cladding surface so that evanescent waves of the various supported modes can be perturbed.

In regard to the above, as shown in FIG. 6, a transducer or sensor 24 is mounted in a rigid, open-sided housing 27 having a semi-permeable membrane 29 positioned across the open side of the housing. The semi-permeable membrane 29 is chosen to minimize clotting effects. The sensor 24 includes a fiber cavity 26 of selected length laterally coupled to a combined light energy input and output fiber 28 which extends through and is sealed to a side wall of the container 27. Scanning light energy is introduced into the input/output fiber 28 from the light energy source S and is laterally coupled into the fiber cavity 26. The optical energy present in each of the supported transmission modes will resonate at selected wavelengths dependent upon the optical path length, with the resonant peaking of the supported higher order modes affected by their perturbed evanescent waves. An operating medium or fluid 30 is chosen to change its index of refraction in response to blood oxygen concentration, carbon dioxide concentration, or other blood constituent as desired.

In use, the housing 27 is immersed in or exposed to a blood sample 32 and information outputted from the input-output fiber 28 is presented to a half-silvered mirror M which directs a portion of the output energy to the evaluator E. Peak relative wavelength shift is utilized to determine blood pressure characteristics. In addition to the shift in peak wavelength of each set of resonant lines, one can also observe the relative width of each line. The absorption of the supported higher order modes by the external fluid will lower the finesse of that mode and broaden the associated line or lines. Since the lowest order mode penetrates into the exchange fluid much less, its finesse will be less affected and, consequently, the line-broadening tendency will be less. Therefore, color changes in the exchange fluid or the blood itself can be detected by relative line-broadening between the lines of the lowest or lower order modes and the supported higher order modes.

Consequently, the use of multiple modes or multiple polarizations is advantageous where several parameters are to be observed and is particularly advantageous where a weakly interacting parameter is to be observed in the presence of other strongly interacting parameters.

For increased precision in general, while it will be frequently possible to devise a sensor which responds to pressure but is insensitive to temperature to some desired approximation, in very exacting applications it will be more accurate to use two sensors with contrasting response matrices to pressure and temperature. The output of the evaluator E, which is a function of the sensed pressure and temperature, can be digitized and provided to a memory controlled microprocessor programmed to solve the matrices and, if desired, linearize the output. It is more advantageous, however, to use one unitary sensor with several outputs than two discrete sensors which may not be measuring the same field since they cannot be in exactly the same position. Further, while the advantages of multiple modes in a single core resonant cavity have been described above, it is also possible to place two cores in close proximity within the same fiber, as shown in FIGS. 7 and 8 to provide multiple transducer or sensor response.

FIG. 7 depicts a sensor in which cores 34 and 36 are both arranged in close proximity to a longitudinally extending opening or cavity 38 within rectangular, tubular cladding 40. FIG. 8 depicts a similar tubular configuration where core 34 is proximate to internal opening 38 while core 36 is proximate an outside edge of cladding 40.

The dual cores 34 and 36, providing the resonant cavity length, can be fed from separate, individual cores or fibers, or from a common single fiber or core. That is, a pair of input fibers or cores (see FIG. 10) may be laid parallel to cores 34 and 36 or a single core laid at a fixed distance from both cavity cores (see FIG. 9).

In FIG. 9, the input fiber 42 has an input/output core 44 surrounded by rectangular cladding 46. The resonant cavity fiber 48 has dual cores 50 and 52 in a rectangular cladding 54 with an isolator slot 54 between the cores. Similarly, FIG. 10 depicts a single input fiber 42 in which dual energy input cores 58 and 60 are located on opposite sides of an isolation slot 62 for coupling, respectively, to corresponding cores 52 and 50 of the dual core resonant cavity fiber 54.

In the structure of FIG. 9, the isolator slot 56 prevents adverse interaction or cross-modulation between the cores 50 and 52 of the resonant cavity fiber, and, in the structure of FIG. 10, the isolator slots 56 and 62 prevent cross-modulation between the cores 50 and 52 and the cores 58 and 60, respectively. Although the isolator slots, or equivalent discontinuities, of FIGS. 9 and 10 are not absolutely necessary, they simplify the interpretation of the resonant lines. While the sensor cavities of FIGS. 9 and 10 are not in the exact same physical location, they can be laterally separated by less than 20 microns so that they are much nearer to the ideal than two widely separate fibers.

Resonant cavity sensors are particularly suited for networks of transducers as shown in FIG. 11, where cavity transducers 64, 66 and 68 are supplied with input optical energy by a common input/output trunk 70. Scanning energy is introduced from a source S through a half-silvered mirror into the trunk fiber 70 with return, output energy directed into the spectral analyzer, evaluator E. In this application, it is preferable to isolate parts of the input spectrum for use in the separate transducers 64, 66 and 68 to avoid confusion as to which output line originates from which sensor. For this purpose, the trunk fiber 70 and cavities 64, 66 and 68 can have cores of different diameters and indices of refraction to form dispersive lateral couples as described in applicant's U.S. Pat. No. 4,342,499 for COMMUNICATIONS TUNING CONSTRUCTION.

The sensitivity of a resonant cavity sensor is proportional to its finesse, which is determined by the total losses of light in a round trip through the cavity. If means for amplification are provided, these losses can be offset, in part, to improve the finesse, and if the net balance of round trip gains and losses yields a net gain, then the cavity can be driven toward and into oscillation. For the latter case, it is not necessary to provide a wavelength scanning input since the output frequency fluctuation may be observed.

Consequently, as shown in FIG. 11A, if a solid state laser diode D is made a part of the resonant cavity 10 of FIG. 1 or 3, the power input to the diode D can be adjusted to provide amplification of the cavity energy, and thus determine the cavity finesse, or to oscillate.

Thus, the cavity fiber 10 is in this instance comprised of active gain material, such as Neodymium, with the diode D operating at one of the pump lines of such material. In this illustration, the diode D is butt coupled to one end of the cavity fiber, through a focusing lens, for example, and thus the mirror at this end of the fiber cavity is of reduced reflectivity to permit input of the pump power while preserving the fixed cavity length. This arrangement is also applicable to ring resonators of the type shown in FIGS. 12 and 13, and it should be understood that both lateral and butt coupling can be utilized for introduction of the pump power.

If the system is allowed to oscillate, then the output cannot be shifted by more than one order spacing by the sensor or else the oscillation will jump orders back to the order nearest the peak of the gain curve of the device. This effect limits the range of the sensor in the oscillation mode. The laser diode D is itself sensitive to various environmental parameters, most notably temperature, however, this influence can be offset, to an extent, if the sensor measures temperature and some other parameter and if the diode D temperature is maintained at the same temperature as the sensor by contacting the same thermal ballast, such as a thermal bath. In this case, the sensitivity of the diode D to temperature variations enters into the response matrix by way of the cavity's temperature response and can be accounted for in evaluating the output.

Amplification of the cavity energy can also be provided by stimulated Raman scattering and stimulated Brillouin scattering. The Raman cross-section is flatter in frequency and hence has less tendency to "pull" the resonant lines of the system toward the Raman gain peak. However, the Raman gain curve is also smaller, so more pump energy is required.

An example of Raman effect amplification for the output signal is shown in FIG. 11$b$ in which a plurality of laser diodes $D_1, D_2 \ldots D_n$ each introduce spectral energy through respective tap fibers $T_1, T_2 \ldots T_n$ laterally coupled into a branch fiber 71 that is laterally coupled to the resonant cavity 10. The injected optical energy will cause amplification of the light in the cavity fiber by Raman stimulation. Further disclosure relating to techniques for effecting optical amplification by the Raman effect is presented in copending U.S. patent application Ser. No. 536,655, filed Sept. 28, 1983 and entitled OPTICAL COMMUNICATIONS SYSTEM USING RAMAN REPEATERS AND COMPONENTS THEREFOR, the disclosure of which is incorporated herein by reference.

In a practical system, the losses in the cavity 10 will be largely mirror end losses (except for the ring cavity) and will be 1-5% per cavity round trip. In a single mode sensor operating in the one micron wavelength region near cut-off with a numerical aperture of approximately 0.2, the peak Raman gain in silica is about 60 decibels per kilometer per watt of pump power. As a 1% loss is 1/25 decibel, 1/1500 watt kilometer or 1/15 watt-meter is needed to offset a 1% loss. This would restrict the use of Raman gain for amplification purposes to rather long sensors or higher pump power levels, unless the pump operates at another resonant order of the cavity. In such a case, the internal pump power is greater than the input pump power in proportion to the finesse of the cavity. If the finesse is 100, for example, this reduces the requirement to 1/1500 watt-meter for the product of external pump power level times sensor length.

In the case of ring cavities (later explained in more detail in regards to FIGS. 12 and 13), the round trip losses can be reduced to 1/10% by careful end coupling. That is, a high efficiency end coupling increases the finesse of the resonant ring and decreases the losses to be made up, bringing the requirement to approximately 1/150000 watt-meters. If this latter system is operated in the oscillating mode, the pull of the Raman gain curve on the resonant lines can be reduced by flattening the Raman gain. This can be accomplished, as described in detail in the above-noted application Ser. No. 536,655, by using two or more pump lines disposed relative to the branch line so that the composite gain is flat in the region of the branch line frequencies. Brillouin gain can also be used subject to the limitations imposed by the sharpness of the Brillouin gain curve. Again, double or multiple pump lines can be used to create a flatter composite gain curve, but one is limited in any case to a narrow dynamic range.

In addition to the linear type cavities previously described, a ring resonator or ring cavity, wherein the wave is reentrant in the cavity rather than reflected, can also be utilized. For example, a ring cavity transducer, is quite suited for rotation sensing. For instance, an exemplary rotation sensor in which pump beams are provided in both directions (clockwise and counterclockwise) is shown in FIG. 12, in which fiber 72 is looped upon and laterally coupled to itself at 80 to define a loop section 74, a loop lateral coupling zone 80 and output sections 76 and 78. Fibers 82 and 84, through lateral coupling at 86 and 88, introduce, in clockwise and counterclockwise senses, respectively, pump beams. Spectral analyzers 86 and 88 are arranged to analyze the spectral outputs from the output ports 76 and 78, respectively. Rotation of the loop results in an effective alteration of the loop resonance for each direction of pumping transmission, and thus a shift in frequency of the energy transmitted to each output 76 and 78. Consequently, the relative frequency shift between the transmitted pump beams, as detected by the analyzers 86 and 88, can sense rotation of the loop assembly.

In FIG. 13 a transducer 90 is illustrated as having a ring resonator 92 comprising a fiber 94 coupled to itself at 96 and to an input/output fiber 14. Operation of the transducer is essentially the same as that previously explained with regard to the embodiment of FIG. 1 with, however, the cavity operation being a reentrant ring. As in the transducer or sensor of FIG. 1, a spectral band is introduced in the fiber 14 by a modulated source S and analyzed at the output of this fiber by a spectral analyzer or evaluator E.

For clarity of the illustration, the ring resonator 92 is illustrated as laterally coupled at 96; however, butt coupling is also applicable. For lateral coupling, as previously noted, the fibers 14 and 94 are preferably rotationally nonsymmetric to permit efficient lateral coupling between their eccentrically positioned cores. Like the linear cavity resonators previously described, the ring cavity may be employed as sensor or the device driven, for example, thermally, as later explained below with regard to the linear cavity system of FIG. 15. Further, the ring may replace the previously illustrated mirrored cavities. For instance, the ring may be tapped by a separate fiber (not shown) for the transducer output similar to that of the embodiment of FIG. 5, or several rings may be utilized as in FIG. 11, etc.

Figure 14:
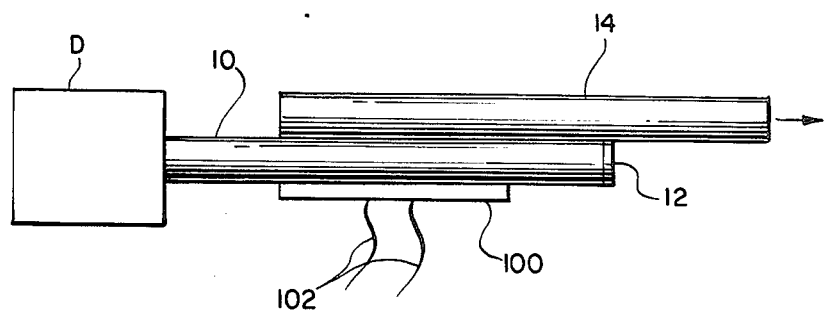
FIG. 14 is a schematic representation of a modulator employing a fiber cavity.
Figure 15:
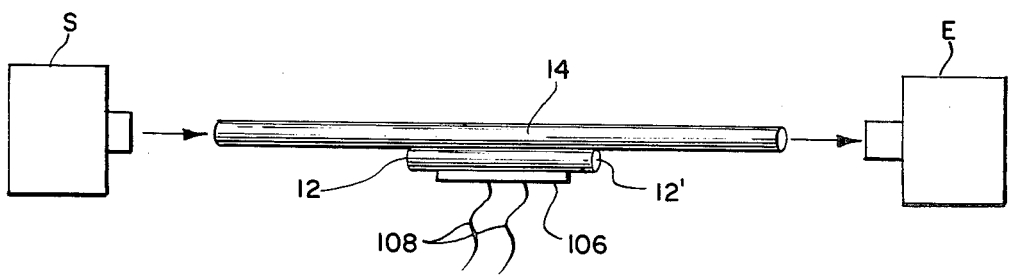
FIG. 15 is a diagrammatic representation of the transducer of the invention employed for switching arrangements.

The cavity arrangement may also be utilized for light modulation as illustrated in FIG. 14 wherein a laser diode D is directly coupled to the resonant cavity 10 which, in turn, is laterally coupled to an output fiber 14. The cavity 10 is mounted on or affixed to a plate 100 of piezoelectric material which is driven by means of leads 102 to tune the cavity. Thus, the expansion and contraction of the plate 100 causes a respective stretching and compression in the cavity 10 which, in turn, pulls or shifts the diode frequency and thus provides a modulated output of the fiber 14. Modulation of the output of the sensor arrangements of FIGS. 1, 3 and 11 can also be modulated by tuning the cavity as shown in FIG. 15 wherein the transducer of FIG. 1 includes a piezoelectric plate 106 affixed to the cavity fiber 10 such that variation in the voltage input to plate 106 will sweep the output valleys (see FIG. 2) across the full spectrum of the source S. Other forms of tuning can also be utilized; for example, the plate 106 can be heated, etc. The plate 106 can also serve with the transducer structure of the invention to provide a switching function, and it should also be understood that the arrangement of FIG. 15 is equally applicable to the above-noted ring resonators.

Other alternative embodiments are contemplated by the above explanation and description, and the present invention is thereby to be accorded the full scope of the following claims.

What is claimed is:

1. An optical fiber waveguide transducer for measuring or responding to an environmental condition to which at least a portion of the transducer is exposed, said transducer comprising:
   an optical fiber waveguide resonant cavity; means for laterally introducing to said resonant cavity optical energy from a source having at least one wavelength resonatable within said resonant cavity wherein said means for introducing optical energy into said resonant cavity comprises an input optical fiber laterally coupled to said optical fiber resonant cavity; and means for monitoring the optical energy distribution with respect to wavelength within said resonant cavity to determine said environmental condition.

2. The invention of claim 1 wherein said resonant cavity is comprised of an optical fiber segment of selected length coupled to itself to form a loop.

3. The invention of claim 2 wherein the ends of said optical fiber segment are laterally coupled to one another to define said loop.

4. The invention of claim 1 wherein said resonant cavity is an optical waveguide of the single-mode type and supports only one polarization alignment for the single mode.

5. The invention of claim 4 wherein said resonant cavity comprises an optical energy transmitting core having major and minor orthogonal axes.

6. The invention of claim 1 wherein said monitoring means further comprises means for removing a portion of the optical energy from said resonant cavity, said removing means includes an output optical fiber laterally coupled to said resonant cavity.

7. The invention of claim 1 wherein said means for monitoring the optical energy in said resonant cavity determines wavelength shift as a function of said environmental condition.

8. The invention of claim 1 wherein said means for monitoring the optical energy in said resonant cavity determines changes in the finesse of at least one optical energy peak as a function of said environmental condition.

9. The invention of claim 1, wherein said resonant cavity is defined by a segment of optical fiber having an optical energy transmitting core and a cladding structure, said cladding structure configured to have anisotropic strain characteristics.

10. The invention of claim 9 wherein said cladding is provided with an internal opening to cause anitsotropic strain characteristics in response to an environmental condition.

11. The invention of claim 1 including a pair of optical fiber resonant cavities defined by a segment of optical fiber having at least two optical energy transmitting cores and a cladding structure.

12. The invention of claim 11 wherein said cladding structure is configured to have anisotropic strain characteristics.

13. The invention of claim 12 wherein said cladding is provided with an internal opening to cause anisotropic strain characteristics in response to an environmental condition.

14. The invention of claim 13 wherein said optical energy transmitting cores are positioned laterally adjacent to one another and equispaced between the internal opening and an exterior surface of the cladding.

15. The invention of claim 13 wherein one of said optical energy transmitting cores is positioned between the internal opening and an exterior surface of the cladding and the other of said optical energy transmitting cores is positioned between said one core and the surface of the cladding.

16. The invention of claim 11 further comprising energy transfer preventing means for preventing optical energy in one of said cores from affecting the optical energy in the other of said cores.

17. The invention of claim 16 wherein said energy transfer preventing means comprises a discontinuity in the cladding intermediate said cores.

18. The invention of claim 11 wherein said input optical fiber has one energy carrying core laterally coupled to said at least two optical energy transmitting cores of said cavities.

19. The invention of claim 11 wherein said input optical fiber has one energy carrying core for each of said at least two optical energy transmitting cores.

20. The invention of claim 1 further comprising means for effecting optical amplification of the light energy within said resonant cavity to increase the finesse of said transducer.

21. The invention of claim 20 wherein said means for effecting optical amplification includes means for amplifying by Raman stimulated emission.

22. The invention of claim 20 wherein said means for effecting optical amplification includes means for establishing and sustaining oscillation within said resonant cavity.

23. The invention of claim 22 wherein said means for establishing and sustaining oscillation includes a laser diode.

24. An optical fiber waveguide transducer for measuring or responding to an environmental condition to which at least a portion of the transducer is exposed, said transducer comprising:
an optical fiber waveguide resonant cavity; and means for laterally introducing to said resonant cavity optical energy from a source having at least one wavelength resonatable within said resonant cavity and for monitoring the optical energy distribution with respect to wavelength within said resonant cavity to determine said environmental condition, wherein said resonant cavity is comprised of a linear segment of optical fiber of selected length reflectivity coated on both ends.

25. An optical fiber waveguide transducer for measuring or responding to an environmental condition to which at least a portion of the transducer is exposed, said transducer comprising:
an optical fiber waveguide resonant cavity; and means for laterally introducing to said resonant cavity optical energy from a source having at least one wavelength resonatable within said resonant cavity and for monitoring the optical energy distribution with respect to wavelength within said resonant cavity to determine said environmental condition, wherein said resonant cavity is of the multi-mode type and supports optical energy transmission in the lowest order mode and at least one successively higher order mode.

26. The invention of claim 25 wherein said means for monitoring the optical energy distribution within said resonant cavity includes means for independently monitoring the optical energy distribution of said lowest order mode and at least one successively higher order mode.

27. A method of transducing a physical condition to which a portion of the transducer is exposed, the method comprising the steps of:
introducing optical energy into an optical waveguide cavity structure having resonant characteristics, the introduced optical energy including at least one wavelength resonatable within the cavity structure;
exposing the resonant cavity structure to an environmental condition to cause a change in the resonant characteristics of the cavity structure;
monitoring the optical energy distribution with respect to wavelength within the cavity structure to determine changes in the resonant cavity structure;
said introducing step including introducing optical energy into an optical fiber cavity structure of the multi-mode type and establishing a lowest order mode and at least one successive higher order mode within the cavity, said monitoring step further comprising monitoring the respective changes in the energy distributions of the optical energy of the lowest order and at least one successive higher order mode.

28. The method of claim 27 wherein said introducing step comprises introducing optical energy into an optical fiber resonant cavity structure of the multi-mode type having a core and a cladding surrounding the core, a portion of the optical energy of at least one mode higher than the lowest order mode entering the cladding as evanescent waves, and including the step of exposing the evanescent wave containing cladding to an evnironmental condition.

29. An optical fiber waveguide transducer for measuring or responding to an environmental condition to which at least a portion of the transducer is exposed, said transducer comprising:
an optical fiber waveguide resonant cavity; and
means for laterally introducing to said resonant cavity optical energy from a source having at least one wavelength resonatable within said resonant cavity and for monitoring the optical energy distribution with respect to wavelength within said resonant cavity to determine said environmental condition, wherein said means for laterally introducing optical energy to said resonant cavity comprises an optical fiber segment which is laterally coupled to said resonant cavity and wherein said optical energy is introduced into one end of said optical fiber segment and an optical, spectral analyzer is operatively connected to the other end of said optical fiber segment so that said resonant cavity is laterally coupled to said optical fiber segment between said one end of said optical fiber segment and said other end of said optical fiber segment.

30. A method of transducing an environmental condition to which a portion of the transducer is exposed, the method comprising the steps of:
introducing optical energy into a multi-mode type optical waveguide cavity structure having resonant characteristics, establishing a lowest order mode and at least one successive higher order mode within the cavity structure, the introduced optical energy including at least one wavelength resonatable within the cavity structure;
exposing the resonant cavity structure to an environmental condition to cause a change in the resonant characteristics of the cavity structure; and
monitoring the respective changes in the energy distributions of the optical energy of the lowest order and at least one successive higher order mode to determine changes in the resonant cavity structure.

31. A method of transducing an environmental condition to which a portion of the transducer is exposed, the method comprising the steps of:
introducing optical energy into an optical fiber resonant cavity structure of the multi-mode type having a core and a cladding surrounding the core and establishing a lowest order mode and at least one successive higher order mode within the cavity structure, a portion of the optical energy of at least one mode higher than the lowest order mode entering the cladding as evanescent waves;
exposing the evanescent wave containing cladding to an environmental condition to cause a change in the resonant characteristics of the cavity structure; and
monitoring the respective changes in the energy distributions of the optical energy of the lowest order and at least one successive higher order mode to determine changes in the resonant cavity structure.

* * * * *